US009759304B2

(12) United States Patent
Turek et al.

(10) Patent No.: US 9,759,304 B2
(45) Date of Patent: Sep. 12, 2017

(54) POWDER METAL HUB AND TREATMENT

(71) Applicants: Alan G. Turek, Mayville, MI (US); Jeffrey E. Beyerlein, Frankenmuth, MI (US); Niklaus A. Von Matt, Midland, MI (US)

(72) Inventors: Alan G. Turek, Mayville, MI (US); Jeffrey E. Beyerlein, Frankenmuth, MI (US); Niklaus A. Von Matt, Midland, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 53 days.

(21) Appl. No.: 14/607,304

(22) Filed: Jan. 28, 2015

(65) Prior Publication Data
US 2016/0215865 A1    Jul. 28, 2016

(51) Int. Cl.
B22F 3/24 (2006.01)
F16H 55/06 (2006.01)
F16H 55/17 (2006.01)
B62D 5/04 (2006.01)
B22F 3/02 (2006.01)
B22F 3/10 (2006.01)
B22F 3/26 (2006.01)
B22F 5/08 (2006.01)
B29C 65/46 (2006.01)
B29C 65/00 (2006.01)
F16H 55/22 (2006.01)
F16H 57/04 (2010.01)

(52) U.S. Cl.
CPC ............... F16H 55/06 (2013.01); B22F 3/02 (2013.01); B22F 3/10 (2013.01); B22F 3/26 (2013.01); B22F 5/08 (2013.01); B29C 65/46 (2013.01); B29C 66/026 (2013.01); B62D 5/0403 (2013.01); F16H 55/17 (2013.01); F16H 55/22 (2013.01); F16H 57/04 (2013.01); F16H 57/041 (2013.01); B22F 3/24 (2013.01); B22F 2998/10 (2013.01); B22F 2999/00 (2013.01); F16H 2055/065 (2013.01)

(58) Field of Classification Search
CPC ........................................................ B22F 5/08
See application file for complete search history.

(56) References Cited

U.S. PATENT DOCUMENTS 3,180,171 A * 4/1965 Arpin ........................ B05D 7/14
                                                                  419/27
4,708,912 A * 11/1987 Huppmann ............... B21H 5/02
                                                                  428/547

(Continued)

FOREIGN PATENT DOCUMENTS

| WO | 0202296 A1    | 1/2002 |
| WO | 1400660 A1    | 3/2004 |
| WO | 2013127905 A1 | 9/2013 |

OTHER PUBLICATIONS

Extended European search report for related European application No. 16152723.9, dated: Jun. 20, 2016, pp. 13.

Primary Examiner — Jessee Roe
Assistant Examiner — Ngoclan T Mai
(74) Attorney, Agent, or Firm — Cantot Colburn LLP

(57) ABSTRACT

A method of making a worm gear is provided. The method comprises forming a gear hub from a powdered metal material. Thereafter an outer surface of the gear hub is sealed.

9 Claims, 7 Drawing Sheets

(56) References Cited

U.S. PATENT DOCUMENTS

| | | | |
|---|---|---|---|
| 5,714,016 A | | 2/1998 | Ueda et al. |
| 5,786,098 A | | 7/1998 | Walenta et al. |
| 5,897,826 A | * | 4/1999 | Lashmore ............... B22F 3/004 264/109 |
| 6,134,786 A | * | 10/2000 | Graupner ................. B22F 5/08 29/893.35 |
| 6,638,390 B1 | | 10/2003 | Sizelove et al. |
| 7,520,940 B2 | * | 4/2009 | Yoon ........................ B22F 3/24 148/284 |
| 8,328,464 B2 | * | 12/2012 | Sina ...................... E01C 19/286 404/117 |
| 2010/0269617 A1 | * | 10/2010 | Eitzinger ................. B05D 3/12 74/457 |
| 2011/0103995 A1 | * | 5/2011 | Klekovkin .......... C22C 33/0264 419/29 |
| 2014/0339011 A1 | | 11/2014 | Beyerlein et al. |

\* cited by examiner

POWDER METAL HUB AND TREATMENT

FIELD OF THE INVENTION

The subject invention relates to a worm gear hub and more particularly a worm gear hub assembly suitable for use in electric power steering units and systems.

BACKGROUND

In an Electric Power Steering (EPS) unit an electric motor drives a worm shaft and worm gear to provide assist torque to the turning of a steering shaft. This reduces the effort required to steer a vehicle. Currently worm gears used in these systems have been made using a solid steel puck. Each puck is then machined with a knurl on the perimeter. The puck then is the base or hub of the worm gear assembly.

The knurled surface is bead blasted to prep for a silane solution treatment that prepares the metal for bonding. A ring of plastic, made by a spin cast method, is placed on the metal. After the plastic is pressed on, the worm gear assembly is heated to cause the plastic to melt into the knurl surface of the hub and bond to the steel. This is followed by an annealing cycle to stress relieve the plastic. The hub assembly is pressed onto a shaft and teeth are hobbed (or cut) into the plastic ring to complete the gear assembly. As used in an electric power steering application or other application, the knurl to plastic bond transfers assist torque from the worm shaft, through the worm gear assembly, to the steering shaft. The process of making one gear hub assembly can be found in U.S. Pat. No. 6,638,390.

Machining of gear hubs to create the knurled surface with which to bond the plastic requires additional processing and handling.

Accordingly, it is desirable to provide a worm gear hub and worm gear hub assembly capable of transferring torque between a worm shaft and a steering shaft without the prior disadvantages.

SUMMARY OF THE INVENTION

According to one exemplary embodiment of the present invention, a method of making a worm gear is provided. The method comprises forming a gear hub from a powdered metal material. Thereafter an outer surface of the gear hub is sealed.

In another exemplary embodiment of the present invention, a gear hub is also provided. It includes a gear hub body formed from a powdered metal material. The gear hub body has a sealed outer surface.

In yet another exemplary embodiment of the present invention, an electric power steering system is provided. The electric power steering system comprises a steering shaft connected to handwheel at one end and a rack and pinion steering mechanism at an opposite end. A steering assist unit comprising an electric motor operated by a controller and driving a worm is provided. A worm gear is interposed between the worm and the steering shaft, the worm having worm teeth and the worm gear is fitted on the steering shaft. The worm gear further comprises a disk formed from a powdered metal material. The disk has a sealed outer surface. A polymeric ring overlaying a portion of the disk is provided. The ring has gear teeth on an outer edge surface of the ring for meshing with the worm teeth.

The above features and advantages and other features and advantages of the present invention are readily apparent from the following detailed description of the invention when taken in connection with the accompanying drawings.

BRIEF DESCRIPTION OF THE DRAWINGS

Other objects, features, advantages and details appear, by way of example only, in the following detailed description of embodiments, the detailed description referring to the drawings in which.

DESCRIPTION OF THE EMBODIMENTS

Figure 1:
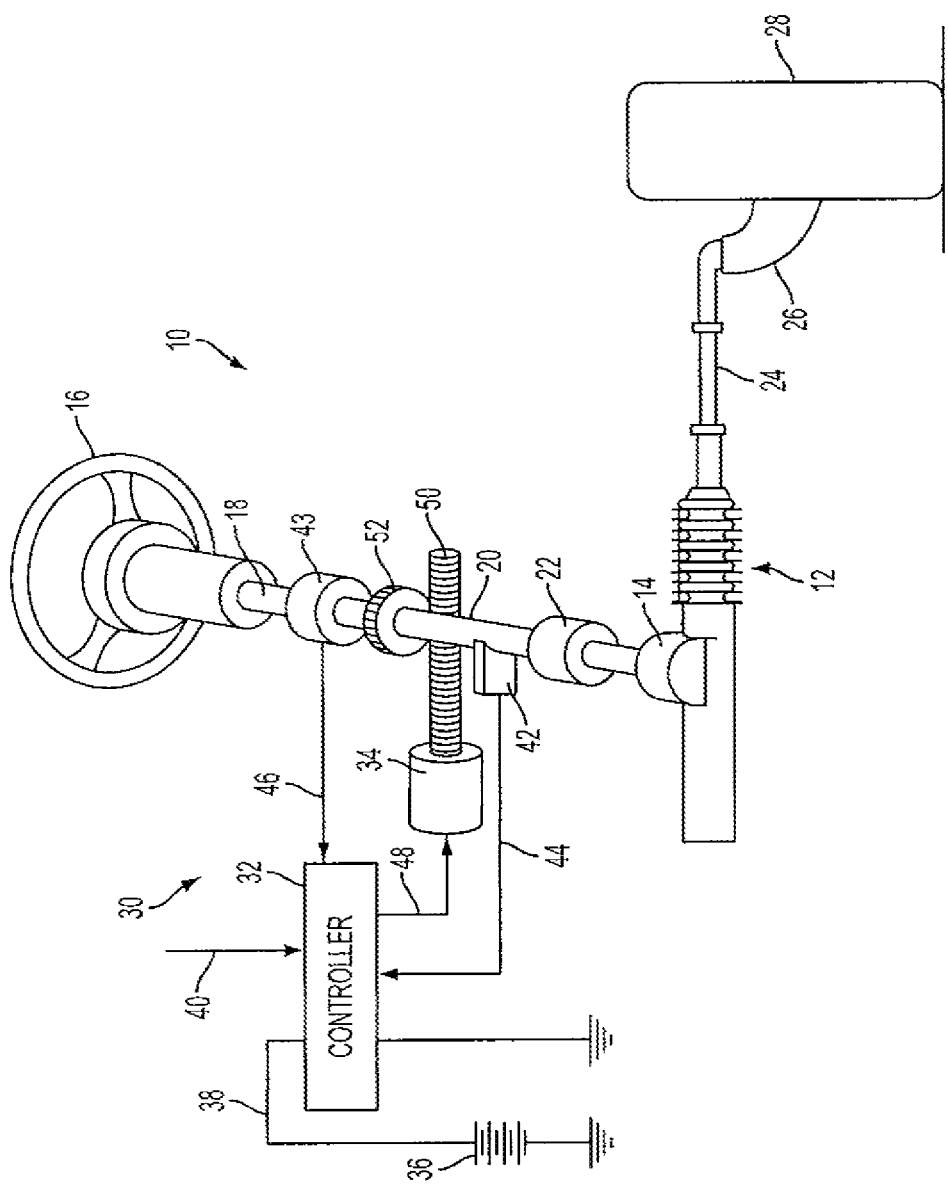
FIG. 1 is a schematic diagram of a power steering system in accordance with the invention.

Referring now to the Figures, where the invention will be described with reference to specific embodiments without limiting same, and in accordance with exemplary embodiments of the present invention, FIG. 1 shows an electric power steering (EPS) system 10 for a motor vehicle. The EPS system 10 includes a rack-and-pinion type steering mechanism 12 that is comprised of a toothed rack (not shown) and a pinion gear (not shown) located under a gear housing 14. A steering wheel 16 is coupled to an upper steering shaft 18. As the steering wheel 16 is turned, the upper steering shaft 18, which is connected to a lower steering shaft 20 and a universal joint 22, turns the pinion gear. Rotation of the pinion gear moves the toothed rack, which moves tie rods 24 (only one shown) that, in turn, move steering knuckles 26 (only one shown), which turn wheels 28 (only one shown).

EPS assist torque is provided through a steering assist unit 30, which includes a controller 32 and an electric motor 34. The controller 32 is powered by a vehicle power supply 36 through a supply line 38. The controller 32 receives a signal indicative of the vehicle velocity on a signal line 40. Steering pinion gear angle is measured by a position sensor 42 and fed to the controller 32 through a line 44. As the steering wheel 16 is turned, a torque sensor 43 senses the torque applied to the steering wheel 16 by a vehicle operator. The torque sensor 43 may include a torsion bar (not shown) and a variable-resistance type of sensor (not shown) that outputs a variable resistance signal to the controller 32 through a line 46 in relation to the amount of twist on the torsion bar.

In response to the inputs on lines 40, 44 and 46, the controller 32 sends a command signal through a line 48 to the electric motor 34. The motor 34, in turn, supplies an assist torque to the steering system 10 through a worm 50 and a worm gear 52, in order to provide a steering torque assist to the steering system 10 that supplements the steering force exerted by a vehicle operator.

Figure 2:
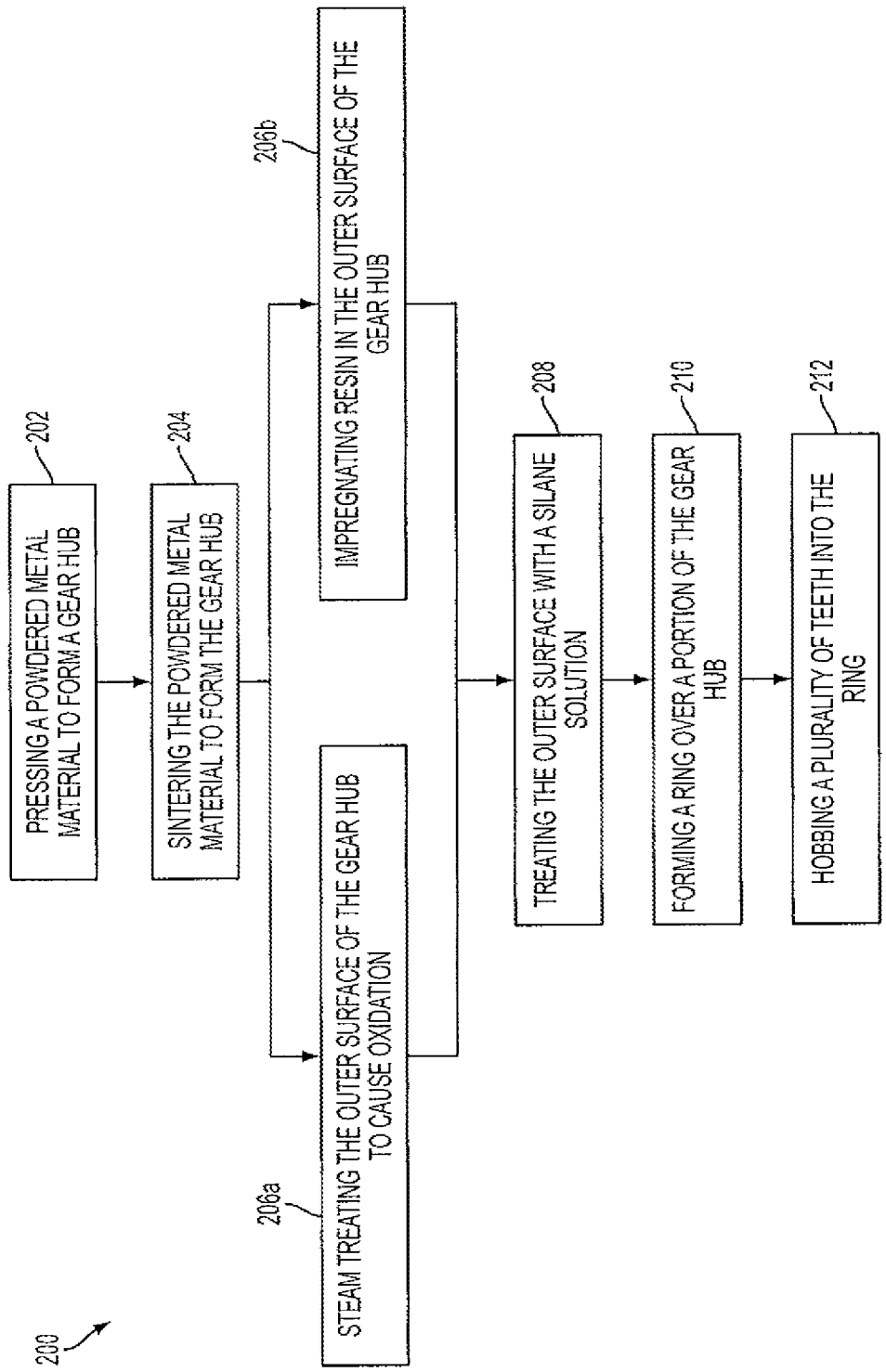
FIG. 2 is a flow chart showing a method to form and treat a powder metal gear hub.

In an exemplary embodiment, a gear hub is used to form worm gear 52. In an exemplary embodiment, the gear hub is formed from powder metal. FIG. 2 shows a flowchart illustrating the manufacturing of a gear hub formed from powder metal. In step 202, powder metal is pressed to form a gear hub. The powder metal may be any suitable powder metal. In an exemplary embodiment, powder metal tooling is used to form the gear hub such as the gear hub shown in FIGS. 3A and 3B.

Figure 3A:
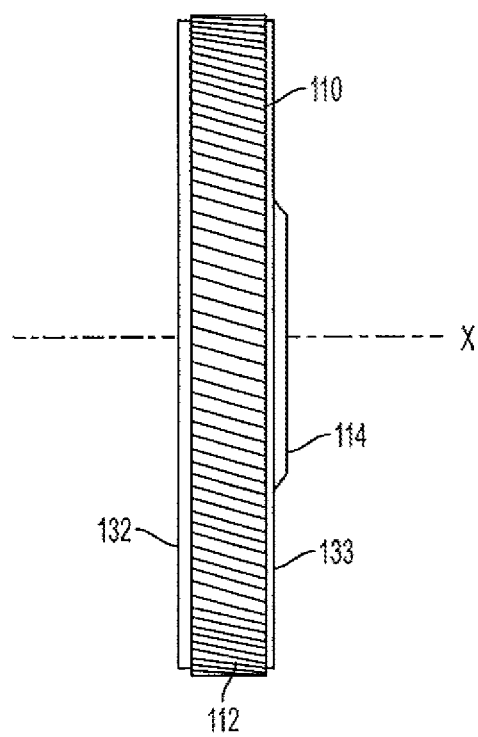
FIG. 3A is an elevation view of a gear hub in accordance with the invention.
Figure 3B:
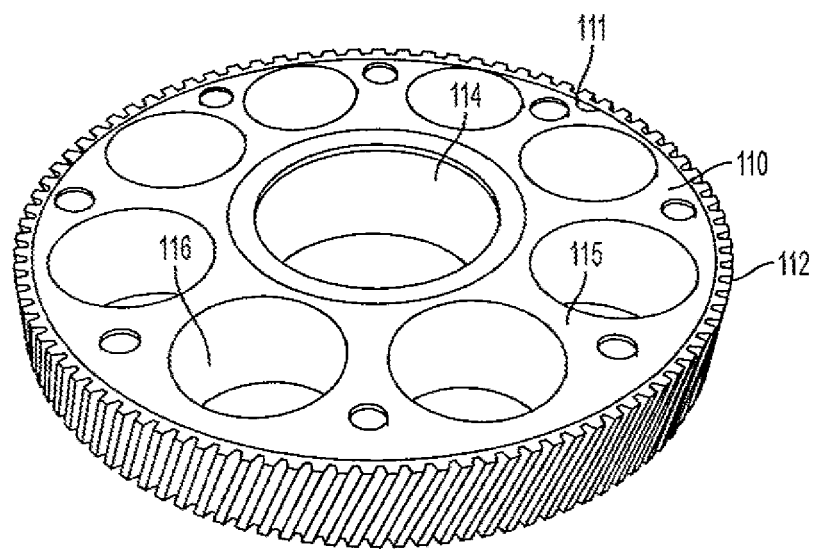
FIG. 3B is an isometric view of a gear hub in accordance with the invention.

FIGS. 3A and 3B show a gear hub 110. In an exemplary embodiment, the gear hub 110 includes a diameter defined by a plurality of teeth 112. In an exemplary embodiment, the teeth 112 are helical teeth 112, extending radially outward at a helical angle from a center axis "X". In certain embodiments, the helical teeth 112 are disposed at an approximate angle of 19 degrees with respect to the "X" axis.

Gear hub 110 also includes an inner circumferential edge 114. A body portion 115 of hub 110 extends between outer circumferential edge 111 and inner circumferential edge 114. An opposite inner face 132 and an opposite outer face 133 of gear hub 110 are generally non-symmetrical on body portion 115. In certain embodiments, holes 116 are formed through faces 132,133. Advantageously, holes 116 may save mass, while facilitating assembly of an EPS unit, such as EPS units shown in FIGS. 1 and 7.

Advantageously, the geometry of gear hub 110, such as the plurality of helical teeth 112, allows a formed gear hub 110 to be easily removed from powder metal tooling, facilitating simplified operations. Further, the geometry of gear hub 110 and helical teeth 112 allow a relatively larger surface area, and excellent axial and radial retention of a polymeric ring formed thereon, facilitating a high quality bond. In certain embodiments, the helical teeth 112 are undercut to further promote the flow of plastic during formation.

Referring back to FIG. 2, in step 204, the pressed powder metal may be sintered to form the gear hub, such as gear hub 110. After sintering, the powder metal may be porous due to the characteristics of the material and formation process. In order to facilitate a strong bond between a metal gear hub and a polymeric ring, an adhesion promoter, such as a silane solution may be applied. However, the porosity of a powdered metal part may compromise adhesion between a powder metal gear hub and a polymeric ring, as well as the application of a silane solution. Accordingly, the surface of gear hub may be treated to promote adhesion and increase the effectiveness of silane solution treatment, as described in steps 206a and 206b.

Figure 4A:
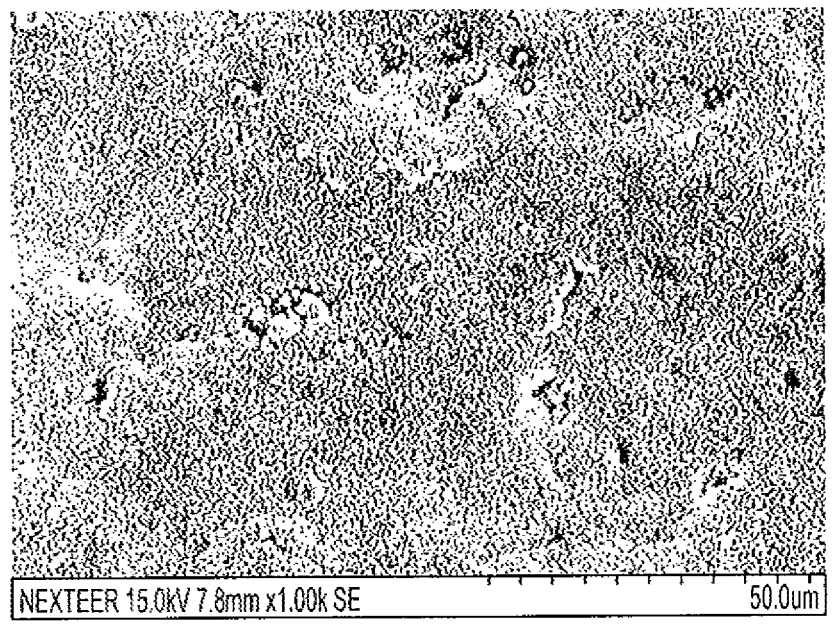
FIG. 4A is a microscopic view of a treated surface of a gear hub.
Figure 4B:
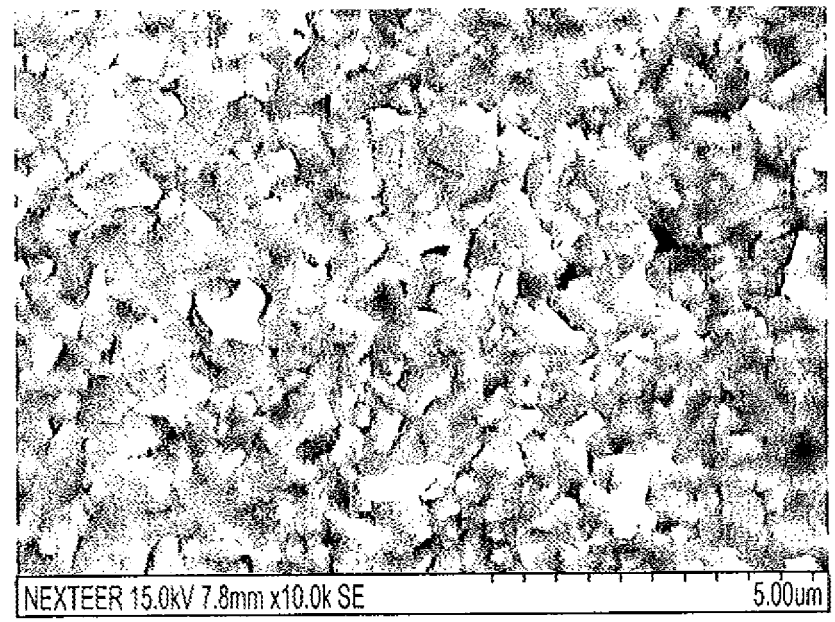
FIG. 4B is another microscopic view of a treated surface of a gear hub.

In an exemplary embodiment, as shown in step 206a, the outer surface of the gear hub may be treated with steam. In an exemplary embodiment, the outer surface of the gear hub is treated with steam to create oxidation to seal the surface and reduce surface porosity. In certain embodiments, the gear hub is exposed to steam ranging from 925 degrees F. to 1000 degrees F. for approximately 1 hour. After such a steam treatment, black oxide is formed on the surface, minimizing surface porosity. Advantageously, surface roughness is also created during steam treatments, further facilitating application of silane solutions and promoting adhesion with a polymeric ring. The relative surface roughness of a steam treated powder metal gear hub is shown in FIGS. 4A and 4B.

In other embodiments, as shown in step 206b, pores of the outer surface are sealed or otherwise treated with a resin. Resin may be impregnated into the outer surface of a powder metal gear hub to facilitate application of silane solution.

In certain embodiments, as shown in step 208, a silane solution is applied to the outer surface of the gear hub. Silane solution can include a polymer chain that facilitates adhesion between the powdered metal gear hub and a polymer such as the polymeric ring used to form the worm gear. In an exemplary embodiment, application of a silane solution creates a monatomic layer at the surface of the gear hub, wherein one side bonds to an inorganic compound, such as the powder metal surface, while the other side bonds to an organic compound, such as a polymeric ring. In an exemplary embodiment, the previous surface treatment of the powder metal gear hub allows the silane solution treatment to remain at the surface of the gear hub and not be absorbed by the porous powder metal construction.

Figure 5:
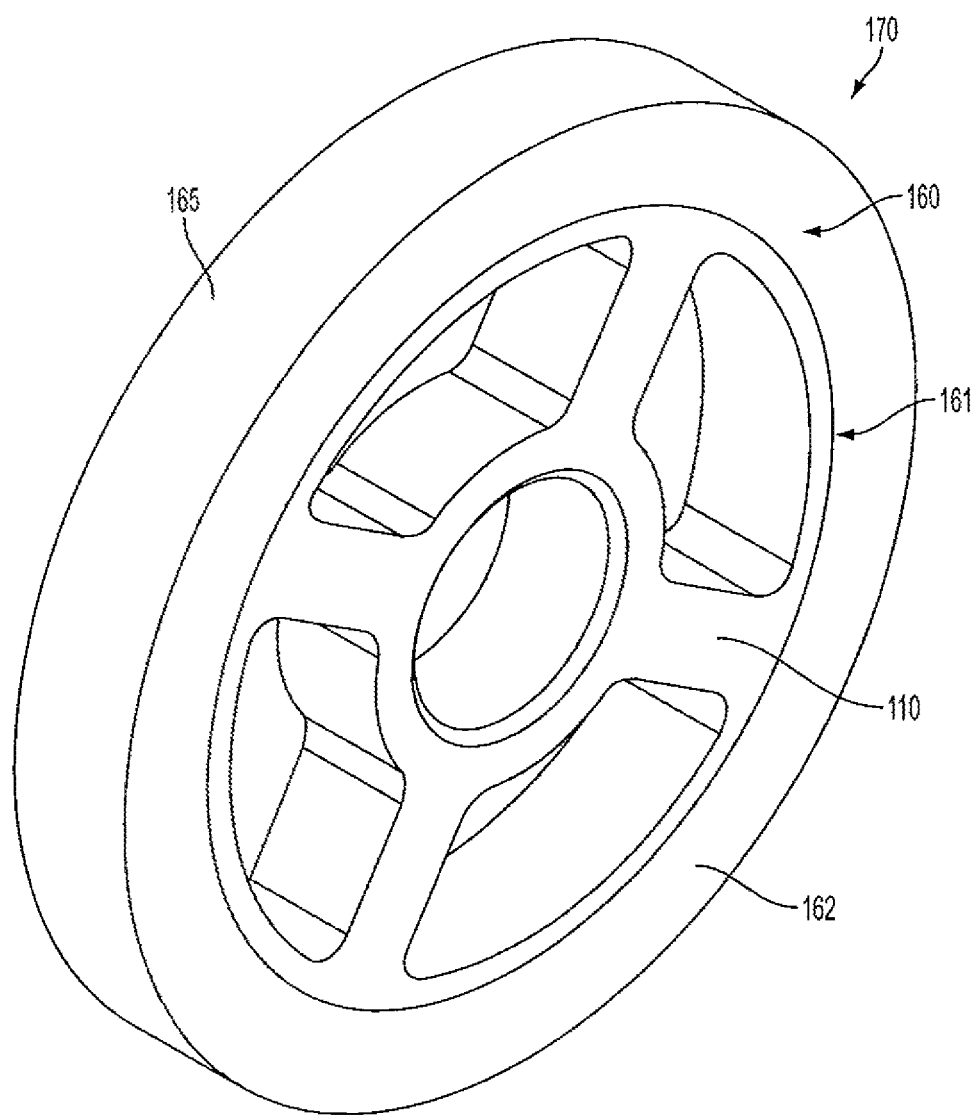
FIG. 5. is a pictorial view showing another aspect of the invention.

In an exemplary embodiment, as shown in step 210, a polymeric ring is formed over a portion of the gear hub. Referring now to FIG. 5, a polymeric ring 160 is placed on gear hub 110 to form a gear blank 170. The surface treatment and silane solution may increase adhesion between the polymeric ring 160 and the gear hub 110. The polymeric ring 160 includes an inner ring face 161, outer ring face 162, and an outer edge surface 163. Outer edge surface 163 has an outer diameter greater than the diameter of gear hub 110. The helical teeth 112 of gear hub 110 are covered by the polymeric ring 160, and encased therein. In an exemplary embodiment, polymeric ring 160 is injection molded onto gear hub 110, facilitated by the helical teeth 112. In other embodiments, polymeric ring 160 is formed from spin cast tubes cut into rings, wherein the resulting polymeric ring 160 is pressed onto a gear hub 110. In certain embodiments, the gear hubs 110 and polymeric rings 160 are inductively heated to melt the inner surface of the polymeric ring 160 to flow into and adhere to helical teeth 112 upon cooling. Advantageously, the helical teeth 112 may be undercut to allow injection molded polymer to flow therein. Further, by forming the polymeric ring over the underlying helical teeth 112, the worm gear 52 may have increased strength, load transfer, axial retention of the polymeric ring 160, and radial retention of the polymeric ring 160. Further, axial sheer is reduced and torque transfer is increased. The polymeric ring 160 is injection molded in a generally rectangular cross-section, forming a generally toroid shape, completing the gear blank 170 as seen in FIG. 5.

Figure 6:
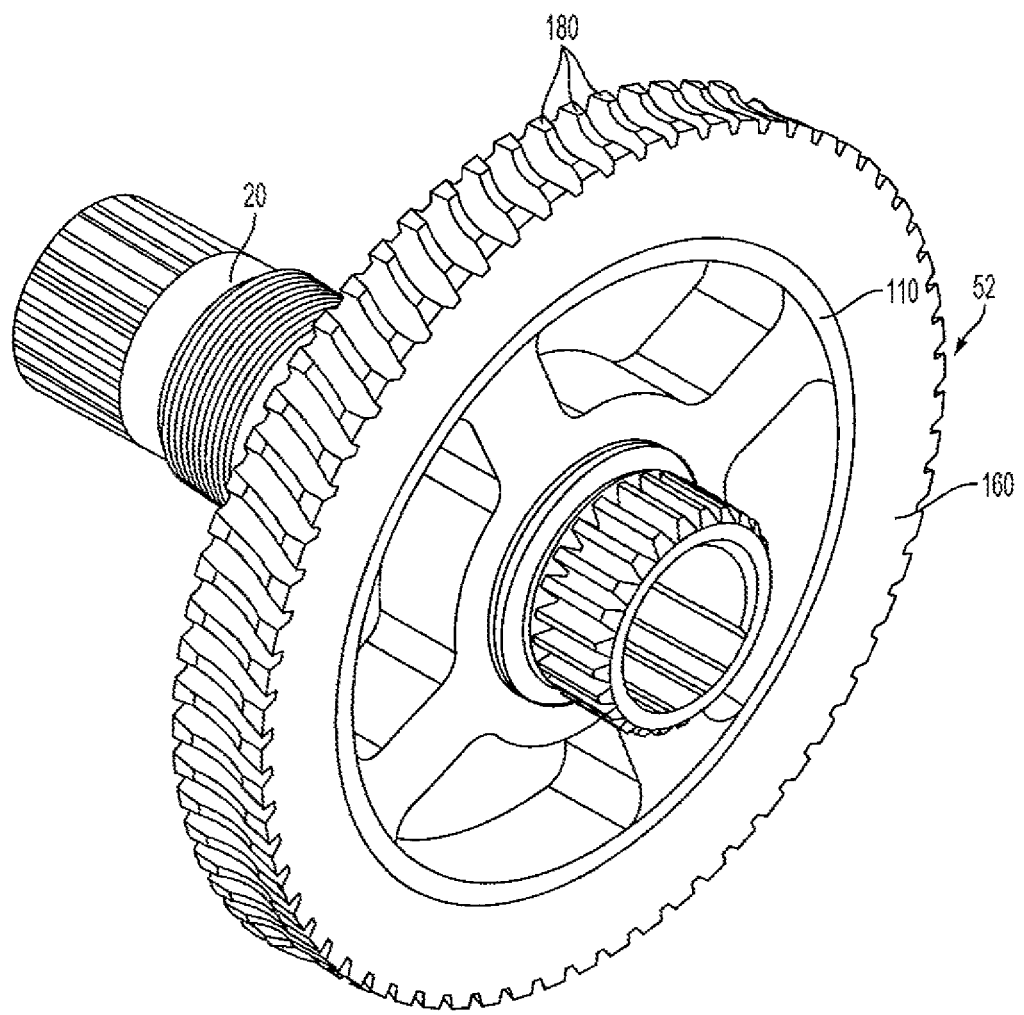
FIG. 6 is a pictorial view of a finished worm gear in accordance with one aspect of the invention.
Figure 7:
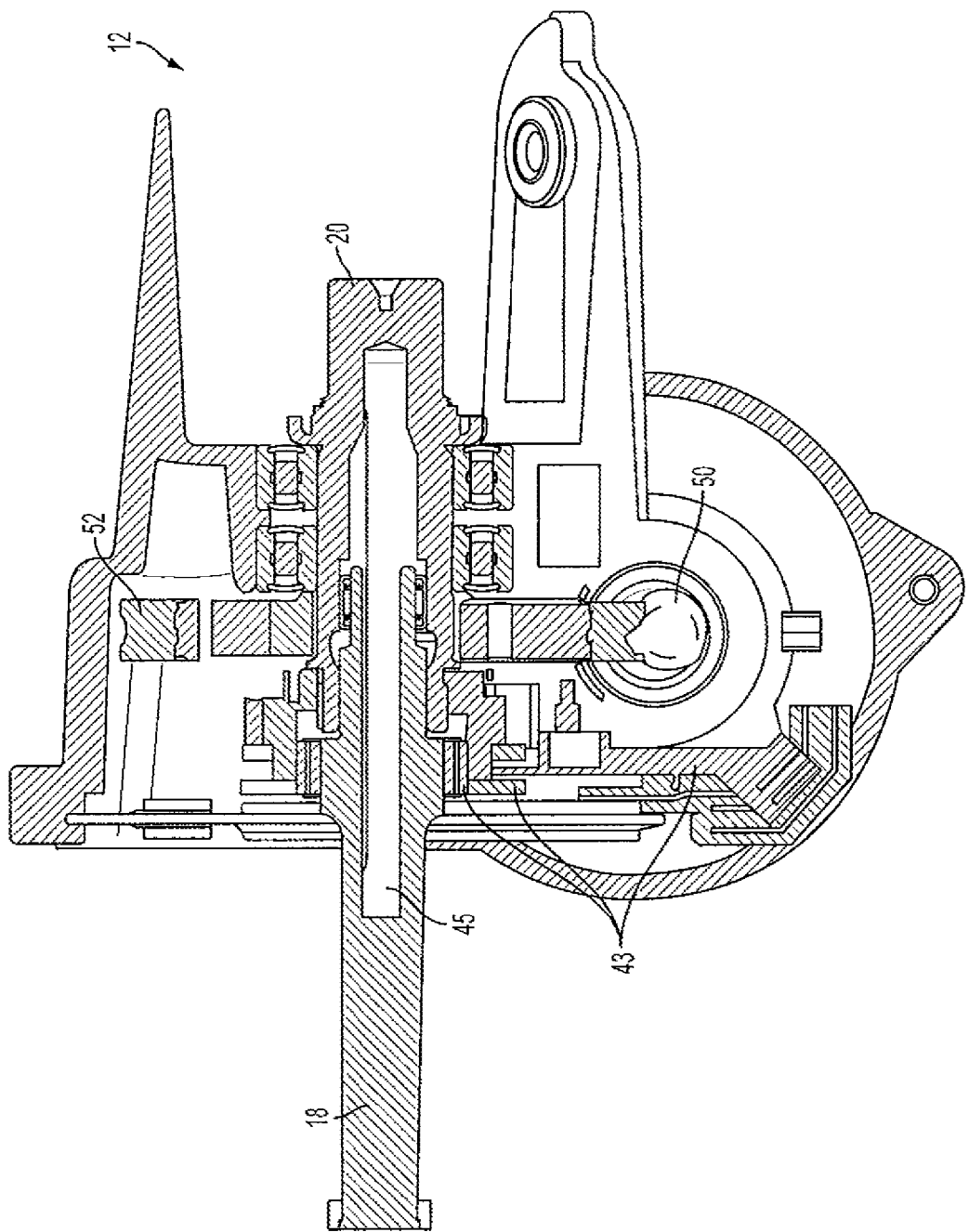
FIG. 7 is an elevation view, partially in cross-section showing another aspect of the invention.

Thereafter, gear blank 170 is pressed onto a shaft, and in the example shown, lower steering shaft 20. The pressing step is followed by a hobbing process, as illustrated in step 212 of FIG. 2, which cuts multiple individual gear teeth 180 into the outer edge surface 163 of polymeric ring 160 of gear blank 170. In certain embodiments, the angle of the gear teeth 180 matches the angle of the helical teeth 112 formed in the gear hub. Advantageously, by forming the gear teeth 180 with the same angle as the underlying helical teeth, the worm gear 52 may have increased strength, load transfer, and axial retention of the polymeric ring 160. Further, axial sheer is reduced and torque transfer is increased. The result is the worm gear 52, shown in FIG. 6 placed within the steering mechanism 12 of FIG. 7. As illustrated, FIG. 7 shows lower steering shaft 20 and torque sensor 43 connected to torsion bar 45. Worm gear 52, shown in cross-section, is pressed on lower steering shaft 20 and driven by the worm 50 which is in turn driven by electric motor 34 (shown in FIG. 1).

The use of powder metal construction allows weight and cost savings, while enabling features such as helical teeth 112 without secondary processes such as machining. In the non-limiting embodiment shown, the helical teeth 112 of the worm gear 52 carries torsional stiffness between the lower shaft 20 and worm 50, allowing EPS system 10 to reliably perform at a significant cost reduction.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the present application.

What is claimed is:

1. A method of making a worm gear comprising:
    forming a gear hub from a porous material; and
    sealing an outer surface of the gear hub; and
    exposing the outer surface to a silane solution after sealing the outer surface.

2. The method of claim 1, wherein sealing is performed by oxidizing the outer surface of the gear hub.

3. The method of claim 1, wherein sealing is performed by impregnating the outer surface of the gear hub with a resin.

4. The method of claim 1, further comprising hobbing a plurality of teeth along an outer circumferential edge of the gear hub.

5. The method of claim 1, further comprising forming or placing a polymeric ring overlaying a portion of the gear hub.

6. The method of claim 1, wherein the porous material is a powdered metal material.

7. The method of claim 6, further comprising pressing the powdered metal material to form the gear hub.

8. The method of claim 7, further comprising sintering the powdered metal material to form the gear hub.

9. The method of claim 8, wherein sealing is performed by steam treating the outer surface of the gear hub.

\* \* \* \* \*